United States Patent [19]

Huang

[11] Patent Number: 5,434,856
[45] Date of Patent: Jul. 18, 1995

[54] METHOD FOR MONITORING COMMUNICATION TALKGROUPS

[75] Inventor: Jian-Cheng Huang, Lake Worth, Fla.

[73] Assignee: Motorola, Inc., Schaumburg, Ill.

[21] Appl. No.: 151,631

[22] Filed: Nov. 15, 1993

[51] Int. Cl.$^6$ ............................................. H04L 12/18
[52] U.S. Cl. ....................................... 370/62; 379/202
[58] Field of Search ...................... 370/62, 94.1, 94.2, 370/95.1; 379/202; 340/825.47

[56] References Cited

U.S. PATENT DOCUMENTS

| | | | |
|---|---|---|---|
| 4,860,003 | 8/1989 | DeLuca et al. | 340/825.48 |
| 5,127,001 | 6/1992 | Steagall et al. | 370/62 |
| 5,229,989 | 7/1993 | Maher et al. | 370/62 |

Primary Examiner—Douglas W. Olms
Assistant Examiner—Min Jung
Attorney, Agent, or Firm—John W. Hayes; Christopher P. Moreno; Wayne J. Egan

[57] ABSTRACT

A voice packet, containing coded voice information for a communication talkgroup that is currently being monitored, is received and stored in a buffer (200-202) dedicated to the communication talkgroup. When a decoder (203-205) is available, the voice packet is decoded and the resulting decoded voice information is combined with other decoded voice information, pertaining to other monitored communication talkgroups, such that the combined decoded voice information can be rendered audible.

9 Claims, 3 Drawing Sheets

METHOD FOR MONITORING COMMUNICATION TALKGROUPS

FIELD OF THE INVENTION

The present invention relates generally to communication systems and, in particular, to a method for monitoring communication talkgroups therein.

BACKGROUND OF THE INVENTION

Communication systems are known to include at least one console and a plurality of communication units, such as hand-held portable or vehicle-mounted mobile radios, organized into multiple communication talkgroups. A communication talkgroup is a set of logically united communication units capable of engaging in group-wide communications. A console is a fixed-end device that allows a dispatcher, operating at a central location, to communicate with individual communication units and/or entire talkgroups. Furthermore, a console can typically monitor communications occurring amongst multiple talkgroups. That is to say, audio derived from multiple talkgroup communications is summed and routed within the console so that an operator of the console can monitor the communications. The use, however, of digital voice compression schemes within communication systems renders the implementation of console monitoring more difficult.

Unlike analog voice or digital PCM (pulse-code modulation) voice, digitally-compressed voice, such as VSELP (vector-sum excited linear predictive coding), is not directly summable. In order to sum multiple compressed voice signals, it is necessary to first convert the compressed signals into a summable format, such as PCM. In a communication system utilizing digitally-compressed voice and containing a large number of talkgroups, a similarly large number of converters, dedicated to individual talkgroups, would be required in order to provide monitoring capability within a console. Unfortunately, the design complexity and cost of providing a large number of converters within a console are prohibitive. Therefore a need exists for a method that allows multiple, digitally-compressed talkgroup communications to be efficiently monitored by a console.

DESCRIPTION OF A PREFERRED EMBODIMENT

Generally, the present invention provides a method for monitoring a plurality of communication talkgroups. This is accomplished by de-multiplexing, queuing and summing many compressed voice sessions in an efficient manner. A voice packet, pertaining to a particular communication talkgroup, is received and stored in a dedicated buffer corresponding to the talkgroup. When a decoder becomes available, the voice packet is decoded and the resulting decoded voice information is combined (summed) with other decoded voice information. The combined voice information is then rendered audible. With such a method, multiple communication talkgroups can be efficiently monitored.

Figure 1:
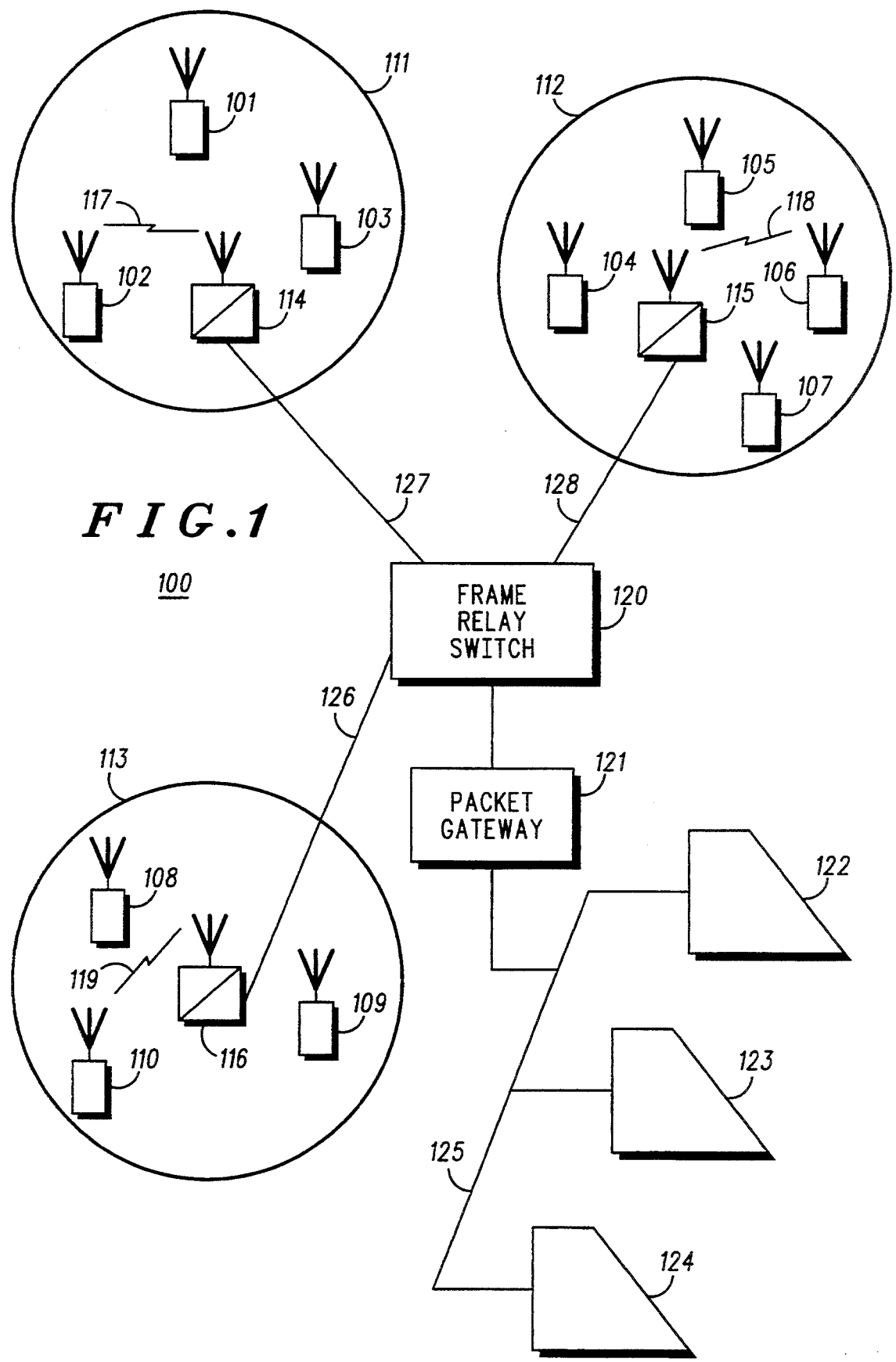
FIG. 1 illustrates a communication system in accordance with the present invention.

The present invention can be more fully described with reference to FIGS. 1-3. FIG. 1 illustrates a communication system (100) that includes communication units (101-110), base stations (114-116), a frame relay switch (120), a packet gateway (121), and consoles (122-124). The base stations (114-116), within their respective coverage areas (111-113), utilize communication resources (117-119) to communicate with the communication units (101-110). The consoles (122-124) communicate with the packet gateway (121) via a local-area network (LAN) (125).

The communication units (101-110) may be a hand-held portable radios organized into communication talkgroups. For example, communication units 101-102 and 104-105 are members of Talkgroup A, communication units 103 and 106-107 are members of Talkgroup B, and communication units 108-110 are members of Talkgroup C. The communication units (101-110) use voice coders, as known in the art, to encode voice information into voice packets for transmission.

The base stations (114-116), which may be Motorola Smartrepeaters operating in conjunction with a site controller, are connected with the frame relay switch (120) via telecommunication links (126-128) such as private telephone lines utilizing T1 or "fractional T1" protocols. The frame relay switch (120), which may be a Motorola Smartzone® controller, provides relay capability of voice packets between the base stations (114-116) as well as the packet gateway (121). The voice packets are blocks of digitally-compressed voice (coded voice information) logically arranged into groups, identified by at least a talkgroup identification (ID). The packet gateway (121) converts voice packets from the format used by the frame relay switch (120) to that used by the LAN (125). The protocol used by the LAN (125) can be any protocol able to accomodate packetized voice.

Figure 2:
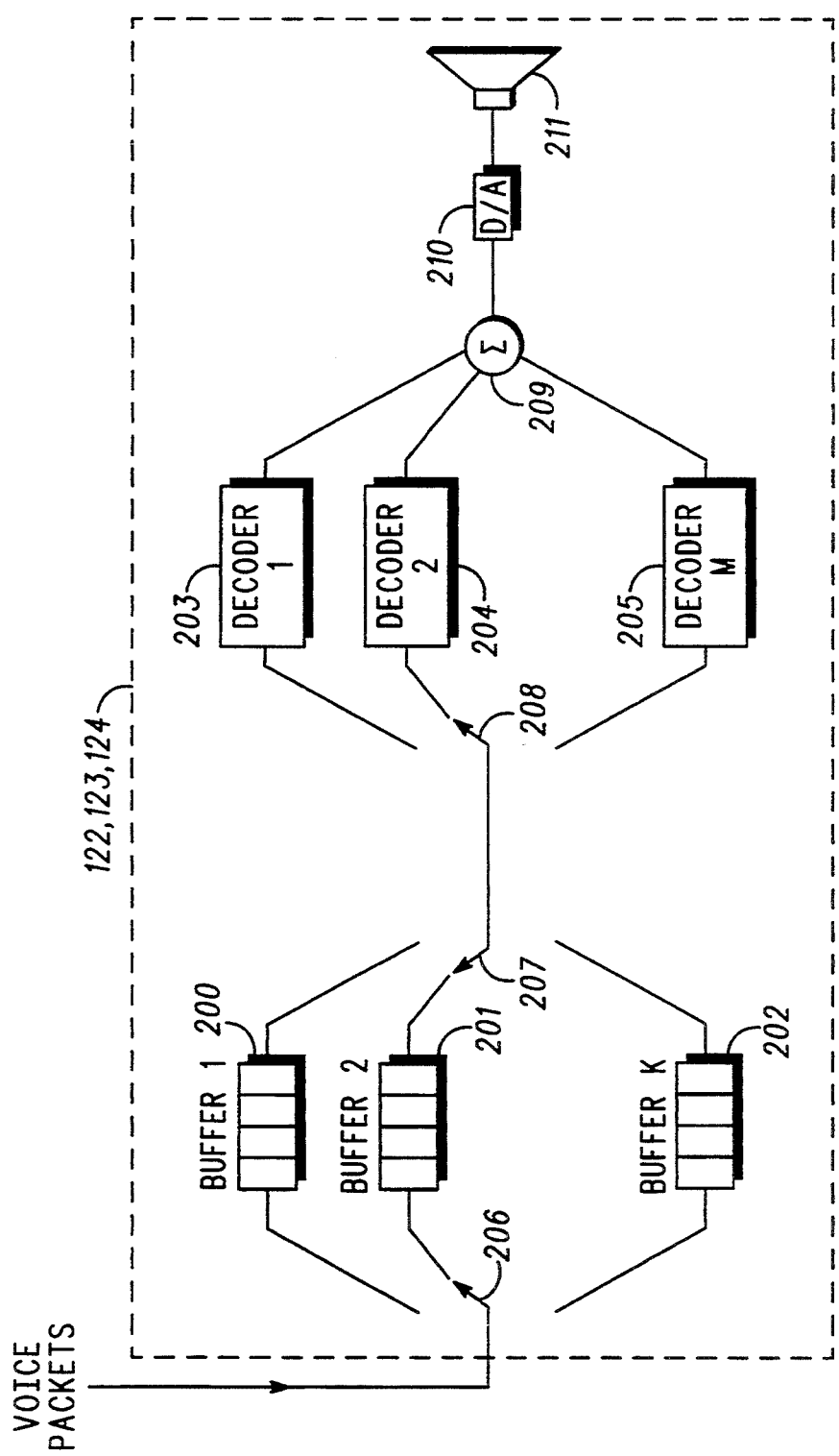
FIG. 2 illustrates a console capable of monitoring multiple, digitally-compressed voice communications in accordance with the present invention.

FIG. 2 illustrates a more detailed depiction of the consoles (122-124) comprising buffers (200-202), decoders (203-205), a data de-multiplexer (206), data routers (207-208), a summer (209), a digital-to-analog converter (D/A) (210), and a speaker (211). Received voice packets are stored in their respective buffers (200-202) by the data de-multiplexer (206) based on their talkgroup ID. Specifically, each of the buffers (200-202) is uniquely reserved for the storage of voice packets received from each of the communication talkgroups. Storage of the voice packets will be discussed later in further detail.

The data routers (207-208) operate to assign a buffer (200-202) to a decoder (203-205) as each decoder becomes available i.e., not in use. In a preferred embodiment, there are K buffers (200-202) and M decoders (203-205) such that $M \approx K/3$, implemented using memory and a single digital signal processing device (DSP), such as a Motorola DSP56000. Each decoder (203-205) comprises only those state variables, stored in memory (not shown), required to operate independently of the other decoders. In this manner, each decoder (203-205) does not require a unique DSP, thus reducing the complexity and cost of the console (122-124). Through analysis of expected voice packet traffic in heavily loaded communication systems, it has been shown that 30 talkgroups can be supported using 8 decoders, assuming a tolerant delay time of 100 ms or less. The tolerant delay time is that amount of time deemed acceptable in delaying the decoding of voice packets.

In a preferred embodiment, each decoder (203–205) produces decoded voice information in PCM format. Each stream of decoded voice information is digitally summed with the other decoded voice information by the summer (209). The resulting summed PCM data is converted to analog form by the D/A (210) and rendered audible through the speaker (211). Further understanding of the operation of the consoles (122–124) may be gained from FIG. 3.

Figure 3:
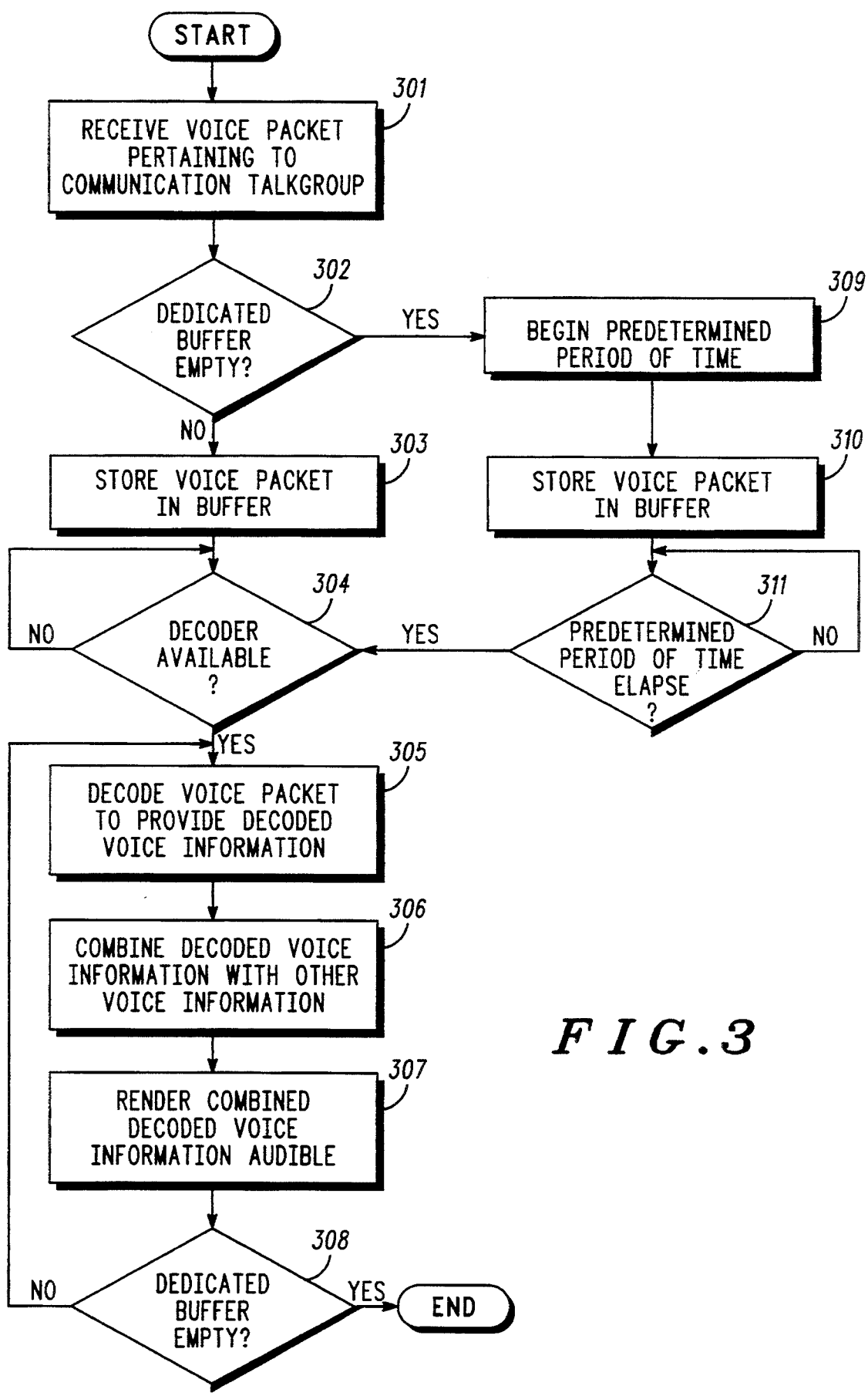
FIG. 3 illustrates a logic diagram that a console may incorporate to implement the present invention.

FIG. 3 illustrates a logic diagram which a console may incorporate to implement the present invention. At step 301, a voice packet is received and, based on its talkgroup ID, the proper dedicated buffer for storage of the voice packet is determined.

If the dedicated buffer is currently empty (302) (i.e., there are no voice packets currently stored in the buffer), a predetermined period of time is begun (309) prior to storing the voice packet in the buffer (310). No further processing of the voice packet is allowed to take place until the predetermined period of time has elapsed (311), at which point it is determined if a decoder is available (304) to convert the voice packet. In a preferred embodiment, the predetermined period of time is set at 30 ms. The predetermined period of time adds delay to the processing of the first received voice packet to compensate for packet delay jitter that may occur during transmission over the telecommunication links (126–128) to ensure that all voice packets associated with a "talkspurt" are correctly decoded. A talkspurt is defined as a sequence of received voice packets corresponding to the same communication. If the first voice packet of a talkspurt is immediately decoded upon reception, it is possible that the second voice packet of the talkspurt could arrive after the decoder has completed decoding the first packet and has been reassigned. Such an event would cause unnatural gaps to occur in the decoded voice information. By delaying processing of the first received voice packet, enough voice packets can be stored to ensure that gaps do not occur in the decoded voice.

If, at step 302, it is determined that the dedicated buffer is not empty, the voice packet is stored (303) in the dedicated buffer and it is determined if a decoder is available (304). A decoder becomes available when the status of the buffer that it is currently serving changes from non-empty to empty, indicating that all voice packets associated with that talkspurt have been decoded.

Once a decoder is assigned to the buffer containing the voice packet, the voice packet is decoded (305). In a preferred embodiment, each decoder converts VSELP frames, extracted from received voice packets, into PCM data streams. The decoded voice information from each decoder is then summed together (306) using a digital adder. The resulting combined decoded voice information is then rendered audible, as discussed previously (307). After each voice packet is decoded, the status of the dedicated buffer is checked (308). If the dedicated buffer is not empty, processing continues at step 305 with the next available voice packet in the buffer. If the dedicated buffer is empty, the process is complete and the decoder is once again available for use with other dedicated buffers.

Those experienced in the art will recognize that the teachings of the present invention could be applied to any communication system utilizing digitally-compressed voice and requiring monitoring capabilities, including digitally encrypted communication systems.

The present invention provides a method for the efficient monitoring of multiple communication talkgroups. With such a method, communication systems utilizing digitally-compressed voice can provide monitoring capabilities without the need for multiple decoding devices. This is accomplished by implementing multiple decoders within a single processing device to service a larger number of buffers dedicated to each talkgroup.

What is claimed is:

1. In a console that receives a plurality of voice packets from a plurality of communication talkgroups, the console comprising a plurality of dedicated buffers and a plurality of decoders, wherein each dedicated buffer of the plurality of dedicated buffers is uniquely associated with one of the plurality of communication talkgroups and each decoder of the plurality of decoders may operate with any of the plurality of dedicated buffers, a method for monitoring the plurality of communication talkgroups, the method comprising the steps of:
   (a) receiving a voice packet of the plurality of voice packets containing coded voice information pertaining to a communication talkgroup of the plurality of communication talkgroups that is currently being monitored;
   (b) when a dedicated buffer of the plurality of dedicated buffers uniquely associated with the communication talkgroup is empty:
      (i) storing the voice packet to the dedicated buffer
      (ii) delaying further processing of the voice packet for a predetermined period of time;
   (c) when the dedicated buffer is not empty, storing the voice packet to the dedicated buffer;
   (d) when a decoder of the plurality of decoders is not in use:
      (i) decoding voice packets stored in the buffer to provide decoded voice information;
      (ii) combining the decoded voice information with other decoded voice information representing other monitored communication talkgroups of the plurality of communication talkgroups to provide combined decoded voice information; and
      (iii) rendering the combined decoded voice information audible.

2. The method in accordance with claim 1, wherein step (d)(i) comprises decoding the voice packet, wherein the plurality of decoders are implemented in a single digital signal processor (DSP) that provides real time operability of the plurality of decoders.

3. The method in accordance with claim 2, wherein the plurality of decoders comprises eight decoders.

4. The method in accordance with claim 1, wherein the plurality of communication talkgroups includes up to 30 talkgroups.

5. The method in accordance with claim 1, wherein step (d)(i) comprises decoding all voice packets stored in the dedicated buffer.

6. The method in accordance with claim 1, wherein the decoded voice information comprises a pulse-code modulation (PCM) data stream.

7. The method in accordance with claim 6, wherein the step (d) (ii) of combining the decoded voice information with other voice information comprises summing PCM data streams.

8. The method in accordance with claim 1, wherein the step (d) (iii) of rendering the combined decoded voice information audible comprises processing the combined decoded voice information through an analog-to-digital converter (A/D).

9. A method for use in a communication system network interconnecting a plurality of communication systems, the communication system network including a plurality of communication units and a console that receives a plurality of voice packets from a plurality of communication talkgroups, the console comprising a plurality of dedicated buffers and a plurality of decoders, wherein each dedicated buffer of the plurality of dedicated buffers is uniquely associated with one of the plurality of communication talkgroups and each decoder of the plurality of decoders may operate with any of the plurality of dedicated buffers, wherein the plurality of voice packets from the plurality of communication talkgroups is:

(I) transmitted to a frame relay switch using a fast packet protocol; and

(11) transmitted via a LAN protocol to the at least one console;

a method for monitoring the plurality of communication talkgroups, the method comprising the steps of:

(a) receiving a voice packet of the plurality of voice packets containing coded voice information pertaining to a communication talkgroup of the plurality of communication talkgroups that is currently being monitored;

(b) when a dedicated buffer of the plurality of dedicated buffers uniquely associated with the communication talkgroup is empty:
(i) storing the voice packet to the dedicated buffer
(ii) delaying further processing of the voice packet for a predetermined period of time;

(c) when the dedicated buffer is not empty, storing the voice packet to the dedicated buffer;

(d) when a decoder of the plurality of decoders is not in use:
(i) decoding voice packets stored in the buffer as a pulse-code modulation (PCM) data stream;
(ii) summing the decoded PCM data stream with other decoded PCM data streams representing other monitored communication talkgroups of the plurality of communication talkgroups to provide combined decoded voice information; and
(iii) rendering the combined decoded voice information audible by processing through an analog-to-digital converter (A/D).

* * * * *